(12) United States Patent
Essenmacher (10) Patent No.: US 9,909,631 B2
(45) Date of Patent: Mar. 6, 2018

(54) APPARATUS FOR CONTROLLABLY ACTUATING A SELECTABLE COUPLING ASSEMBLY HAVING MULTIPLE OPERATING MODES

(71) Applicant: Means Industries, Inc., Saginaw, MI (US)

(72) Inventor: Ryan W. Essenmacher, Saginaw, MI (US)

(73) Assignee: Means Industries, Inc., Saginaw, MI (US)

( * ) Notice: Subject to any disclaimer, the term of this patent is extended or adjusted under 35 U.S.C. 154(b) by 223 days.

(21) Appl. No.: 14/940,226

(22) Filed: Nov. 13, 2015

(65) Prior Publication Data

US 2016/0131206 A1 May 12, 2016

Related U.S. Application Data

(63) Continuation-in-part of application No. 14/933,360, filed on Nov. 5, 2015, now Pat. No. 9,822,825.
(Continued)

(51) Int. Cl.
| | |
|---|---|
| *H01H 9/00* | (2006.01) |
| *F16D 48/06* | (2006.01) |
| *F16D 27/00* | (2006.01) |
| *F16D 41/12* | (2006.01) |
| *F16D 41/14* | (2006.01) |

(52) U.S. Cl.
CPC .......... *F16D 48/064* (2013.01); *F16D 27/00* (2013.01); *F16D 41/125* (2013.01); *F16D 41/14* (2013.01); *F16D 2500/10493* (2013.01)

(58) Field of Classification Search
USPC .................................. 361/23, 139, 144, 160
See application file for complete search history.

(56) References Cited

U.S. PATENT DOCUMENTS 2,947,537 A 8/1960 Littell et al.
2,959,062 A 11/1960 Looker
(Continued)

OTHER PUBLICATIONS

Notice of Allowance, dated May 19, 2017, U.S. Appl. No. 14/933,345.
(Continued)

*Primary Examiner* — Danny Nguyen
(74) *Attorney, Agent, or Firm* — Brooks Kushman P.C.

(57) ABSTRACT

An apparatus for controllably actuating a selectable coupling assembly is provided. The apparatus includes a bi-directionally movable, actuating shaft attachable to a movable element of the assembly to provide selective, small displacement element movement to linearly actuate the assembly. An excitation coil is arranged to be magnetically coupled with the shaft and to controllably move the shaft between positions which correspond to different operating modes of the assembly. A controller includes a power inlet terminal adapted to receive electrical power from a vehicle DC power source, a command input terminal adapted to receive a command signal from an electronic control unit and a power switching and supply circuit coupled to the coil to switch and supply received electrical power to the coil based on the command signal. The shaft moves the element and causes the assembly to change its operating mode when the electrical power energizes the coil.

24 Claims, 3 Drawing Sheets

Related U.S. Application Data (60) Provisional application No. 62/106,307, filed on Jan. 22, 2015, provisional application No. 62/076,648, filed on Nov. 7, 2014.

(56) References Cited

U.S. PATENT DOCUMENTS

| | | |
|---|---|---|
| 4,050,560 A | 9/1977 | Torstenfelt |
| 4,200,002 A | 4/1980 | Takahashi |
| 4,340,133 A | 7/1982 | Blersch |
| 4,651,847 A | 3/1987 | Hermanns |
| 5,043,892 A | 8/1991 | Brekkestran et al. |
| 5,052,534 A | 10/1991 | Gustin et al. |
| 5,070,978 A | 12/1991 | Pires |
| 5,449,057 A | 9/1995 | Frank |
| 5,597,057 A | 1/1997 | Ruth et al. |
| 5,678,668 A | 10/1997 | Sink |
| 5,806,643 A | 9/1998 | Fitz |
| 5,871,071 A | 2/1999 | Sink |
| 5,918,715 A | 7/1999 | Ruth et al. |
| 5,927,455 A | 7/1999 | Baker et al. |
| 5,954,174 A | 9/1999 | Costin |
| 5,964,331 A | 10/1999 | Reed et al. |
| 5,979,627 A | 11/1999 | Ruth et al. |
| 6,065,576 A | 5/2000 | Shaw et al. |
| 6,116,394 A | 9/2000 | Ruth |
| 6,125,980 A | 10/2000 | Ruth et al. |
| 6,129,190 A | 10/2000 | Reed et al. |
| 6,186,299 B1 | 2/2001 | Ruth |
| 6,193,038 B1 | 2/2001 | Scott et al. |
| 6,244,965 B1 | 6/2001 | Klecker et al. |
| 6,290,044 B1 | 9/2001 | Burgman et al. |
| 6,307,376 B1 | 10/2001 | Alexander et al. |
| 6,386,349 B1 | 5/2002 | Welch |
| 6,481,551 B1 | 11/2002 | Ruth |
| 6,505,721 B1 | 1/2003 | Welch |
| 6,571,926 B2 | 6/2003 | Pawley |
| 6,607,292 B2 | 8/2003 | Gutierrez et al. |
| 6,814,201 B2 | 11/2004 | Thomas |
| 6,854,577 B2 | 2/2005 | Ruth |
| 6,905,009 B2 | 6/2005 | Reed et al. |
| 7,025,188 B2 | 4/2006 | Lindenschmidt et al. |
| 7,044,263 B2 | 5/2006 | Fischbach et al. |
| 7,100,756 B2 | 9/2006 | Kimes et al. |
| 7,153,228 B2 | 12/2006 | Fujiu et al. |
| 7,198,587 B2 | 4/2007 | Samie et al. |
| 7,223,198 B2 | 5/2007 | Kimes et al. |
| 7,258,214 B2 | 8/2007 | Pawley et al. |
| 7,275,628 B2 | 10/2007 | Pawley et al. |
| 7,344,010 B2 | 3/2008 | Fetting, Jr. et al. |
| 7,383,930 B2 | 6/2008 | Kimes et al. |
| 7,448,481 B2 | 11/2008 | Kimes et al. |
| 7,451,862 B2 | 11/2008 | Kimes et al. |
| 7,455,156 B2 | 11/2008 | Kimes et al. |
| 7,455,157 B2 | 11/2008 | Kimes et al. |
| 7,464,801 B2 | 12/2008 | Wittkopp |
| 7,484,605 B2 | 2/2009 | Pawley et al. |
| 7,491,151 B2 | 2/2009 | Maguire et al. |
| 7,661,518 B2 | 2/2010 | Kimes |
| 7,690,492 B2 | 4/2010 | Gooden et al. |
| 7,743,678 B2 | 6/2010 | Wittkopp et al. |
| 7,766,790 B2 | 8/2010 | Stevenson et al. |
| 7,942,781 B2 | 5/2011 | Kimes |
| 7,992,695 B2 | 8/2011 | Wittkopp et al. |
| 8,007,396 B2 | 8/2011 | Kimes et al. |
| 8,051,959 B2 | 11/2011 | Eisengruber |
| 8,061,496 B2 | 11/2011 | Samie et al. |
| 8,079,453 B2 | 12/2011 | Kimes |
| 8,187,141 B2 | 5/2012 | Goleski et al. |
| 8,196,724 B2 | 6/2012 | Samie et al. |
| 8,272,488 B2 | 9/2012 | Eisengruber et al. |
| 8,276,725 B2 | 10/2012 | Swales et al. |
| 8,286,772 B2 | 10/2012 | Eisengruber |
| 8,324,890 B2 | 12/2012 | Lin |
| 8,491,439 B2 | 7/2013 | Kimes |
| 8,491,440 B2 | 7/2013 | Kimes et al. |
| 2002/0161500 A1* | 10/2002 | Mase ............... B62D 5/003 701/41 |
| 2004/0222033 A1* | 11/2004 | Kameya ............ B62D 5/008 180/404 |
| 2004/0238306 A1 | 12/2004 | Reed et al. |
| 2005/0189190 A1 | 9/2005 | Kowalsky et al. |
| 2006/0021838 A1 | 2/2006 | Kimes et al. |
| 2006/0185957 A1 | 8/2006 | Kimes et al. |
| 2007/0034470 A1 | 2/2007 | Fetting, Jr. et al. |
| 2007/0278061 A1 | 12/2007 | Wittkopp et al. |
| 2008/0110715 A1 | 5/2008 | Pawley |
| 2008/0169165 A1 | 7/2008 | Samie et al. |
| 2008/0169166 A1 | 7/2008 | Wittkopp et al. |
| 2008/0185253 A1 | 8/2008 | Kimes |
| 2008/0188338 A1 | 8/2008 | Kimes et al. |
| 2008/0223681 A1 | 9/2008 | Stevenson et al. |
| 2009/0062058 A1 | 3/2009 | Kimes et al. |
| 2009/0159391 A1 | 6/2009 | Eisengruber |
| 2009/0194381 A1 | 8/2009 | Samie et al. |
| 2009/0211863 A1 | 8/2009 | Kimes |
| 2009/0233755 A1 | 9/2009 | Kimes |
| 2009/0255773 A1 | 10/2009 | Seufert et al. |
| 2010/0022342 A1 | 1/2010 | Samie et al. |
| 2010/0105515 A1 | 4/2010 | Goleski et al. |
| 2010/0230226 A1 | 9/2010 | Prout |
| 2010/0252384 A1 | 10/2010 | Eisengruber |
| 2010/0255954 A1 | 10/2010 | Samie et al. |
| 2010/0282200 A1* | 11/2010 | Notani ............ F02N 11/0844 123/179.3 |
| 2011/0068775 A1 | 3/2011 | Lin |
| 2011/0177900 A1 | 7/2011 | Simon |
| 2011/0183806 A1 | 7/2011 | Wittkopp et al. |
| 2011/0192697 A1 | 8/2011 | Prout et al. |
| 2011/0233026 A1 | 9/2011 | Pawley |
| 2012/0090952 A1 | 4/2012 | Lee et al. |
| 2012/0145505 A1 | 6/2012 | Kimes |
| 2012/0145506 A1 | 6/2012 | Samie et al. |
| 2012/0149518 A1 | 6/2012 | Kimes |
| 2012/0152683 A1 | 6/2012 | Kimes |
| 2012/0152687 A1 | 6/2012 | Kimes et al. |
| 2012/0231913 A1 | 9/2012 | Samie et al. |
| 2012/0275078 A1* | 11/2012 | Kokubun ............ F02N 11/087 361/160 |
| 2013/0062151 A1 | 3/2013 | Pawley |
| 2013/0199885 A1 | 8/2013 | Quehenberger et al. |
| 2013/0256078 A1 | 10/2013 | Kimes et al. |
| 2014/0190785 A1 | 7/2014 | Fetting et al. |
| 2014/0305761 A1 | 10/2014 | Kimes |

OTHER PUBLICATIONS

International Search Report and Written Opinion, International appln No. PCT/US2016/061488, dated Jan. 19, 2017.

International Search Report and Written Opinion, International appln No. PCT/US2016/062459, dated Jan. 31, 2017.

* cited by examiner

APPARATUS FOR CONTROLLABLY ACTUATING A SELECTABLE COUPLING ASSEMBLY HAVING MULTIPLE OPERATING MODES

CROSS-REFERENCE TO RELATED APPLICATIONS

This application claims the benefit of U.S. provisional application Ser. No. 62/106,307 filed Jan. 22, 2015. This application is a continuation-in-part of U.S. patent application Ser. No. 14/933,360, filed Nov. 5, 2015 which claims the benefit of U.S. provisional application Ser. No. 62/076,648 filed Nov. 7, 2014.

TECHNICAL FIELD

At least one embodiment of the invention generally relates to apparatus for controllably actuating a selectable coupling assembly having multiple operating modes in a vehicular environment.

Overview

A typical one-way clutch (i.e., OWC) includes a first coupling member, a second coupling member, and a first set of locking members between opposing surfaces of the two coupling members. The one-way clutch is designed to lock in one direction and to allow free rotation in the opposite direction. Two types of one-way clutches often used in vehicular, automatic transmissions include:

roller type which includes spring-loaded rollers between inner and outer races of the one-way clutch. (Roller type is also used without springs on some applications); and sprag type which includes asymmetrically shaped wedges located between inner and outer races of the one-way clutch.

One way clutches typically over run during engine braking rather than enable engine braking. It is for this reason there is a friction pack at the same transmission node. Selectable dynamic clutches can be used to prevent the over running condition and enable engine braking.

Controllable or selectable one-way clutches (i.e., SOWCs) are a departure from traditional one-way clutch designs. Selectable OWCs often add a second set of struts or locking members in combination with a slide plate. The additional set of locking members plus the slide plate adds multiple functions to the OWC. Depending on the needs of the design, controllable OWCs are capable of producing a mechanical connection between rotating or stationary shafts in one or both directions. Also, depending on the design, OWCs are capable of overrunning in one or both directions. A controllable OWC contains an externally controlled selection or actuation mechanism. Movement of this selection mechanism can be between two or more positions which correspond to different operating modes. The selection mechanism is a separate system or assembly that is fixed relative to the OWC by same fastening technique. Such selection mechanism is fixed in a separate and subsequent operation after the OWC has been formed. That subsequent operation requires an additional work station, be it automated or otherwise, which increases, in particular, the manufacturing time and cost of the finished assembly.

In addition, the fact that separate, external parts may be mounted on or near the OWC in a source of quality defects and thus adds to the cost of making such controllable or selectable OWC's which may be significant on a mass production basis. Also, due to dimensional stack-up issues control element or selector plate binding can result especially over long term use.

Driven by a growing demand by industry, governmental regulatory agencies and consumers for durable and inexpensive products that are functionally comparable or superior to prior art products, a continuing need exists for improvements in clutches subjected to difficult service conditions such as extreme temperatures. This is particularly true in the automotive industry where developers and manufacturers of clutches for automotive applications must meet a number of competing performance specifications for such articles.

Another problem associated with prior art coupling and control assemblies is that it is undesirable to have a relatively large distance between the control element and the actuator which moves the control element. A large distance reduces the amount of available space in which the assembly is located. For example, in a vehicle, the amount of space for such assemblies is typically quite limited.

U.S. Pat. No. 5,927,455 discloses a bi-directional overrunning pawl-type clutch. U.S. Pat. No. 6,244,965 discloses a planar overrunning coupling for transfer of torque. U.S. Pat. No. 6,290,044 discloses a selectable one-way clutch assembly for use in an automatic transmission. U.S. Pat. No. 7,258,214 discloses an overrunning coupling assembly. U.S. Pat. No. 7,344,010 discloses an overrunning coupling assembly. U.S. Pat. No. 7,484,605 discloses an overrunning radial coupling assembly or clutch.

Yet still other related U.S. patents include: U.S. Pat. Nos. 4,200,002; 5,954,174; and 7,025,188.

U.S. Pat. No. 6,854,577 discloses a sound-dampened, one-way clutch including a plastic/steel pair of struts to dampen engagement clunk. The plastic strut is slightly longer than the steel strut. This pattern can be doubled to dual engaging. This approach has had some success. However, the dampening function stopped when the plastic parts became exposed to hot oil over a period of time.

Metal injection molding (MIM) is a metalworking process where finely-powdered metal is mixed with a measured amount of binder material to comprise a 'feedstock' capable of being handled by plastic processing equipment through a process known as injection mold forming. The molding process allows complex parts to be shaped in a single operation and in high volume. End products are commonly component items used in various industries and applications. The nature of MIM feedstock flow is defined by a science called rheology. Current equipment capability requires processing to stay limited to products that can be molded using typical volumes of 100 grams or less per "shot" into the mold. Rheology does allow this "shot" to be distributed into multiple cavities, thus becoming cost-effective for small, intricate, high-volume products which would otherwise be quite expensive to produce by alternate or classic methods. The variety of metals capable of implementation within MIM feedstock are referred to as powder metallurgy, and these contain the same alloying constituents found in industry standards for common and exotic metal applications. Subsequent conditioning operations are performed on the molded shape, where the binder material is removed and the metal particles are coalesced into the desired state for the metal alloy.

Other U.S. patent documents related to at least one aspect of the present invention includes U.S. Pat. Nos. 8,491,440; 8,491,439; 8,272,488; 8,187,141; 8,007,396; 7,690,492; 7,661,518; 7,455,157; 7,455,156; 7,451,862; 7,448,481; 7,383,930; 7,223,198; 7,100,756; and 6,290,044; and U.S.

published application Nos. 2013/0062151; 2012/0149518; 2012/0145505; 2011/0233026; 2010/0105515; 2009/0233755; 2009/0062058; 2008/0188338; and 2006/0021838.

Another example of an overrunning planar clutch is disclosed in U.S. Pat. No. 5,597,057.

Some U.S. patents related to the present invention include: U.S. Pat. Nos. 5,052,534; 5,070,978; 5,449,057; 5,678,668; 5,806,643; 5,871,071; 5,918,715; 5,964,331; 5,979,627; 6,065,576; 6,116,394; 6,125,980; 6,129,190; 6,186,299; 6,386,349; 6,481,551; 6,505,721; 6,571,926; 6,814,201; 7,153,228; and 7,275,628.

U.S. Pat. No. 8,196,724 discloses a control module configured to actuate a displacement actuator of a 2 position SOWC via a spring returned solenoid to move a pin and a slide plate from a first position to a second position using a first voltage potential, and configured to hold the displacement actuator in the second position using a second voltage potential less than the first voltage potential.

Other related U.S. patent publications include 2012/0145506; 2011/0192697; 2011/0183806; 2010/0252384; 2008/0223681; 2008/0169165; 2008/0169166; 2008/0185253; and the following U.S. Pat. Nos. 8,079,453; 7,992,695; 8,051,959; 7,766,790; 7,743,678; and 7,491,151.

Other U.S. patent publications which disclose controllable or selectable one-way clutches include U.S. Pat. Nos. 6,193,038; 7,198,587; 7,275,628; and 7,464,801, and U.S. Publication Application Nos. 2007/0278061; 2008/0110715; 2009/0159391; 2009/0211863; 2010/0230226; and 2014/0190785.

Other U.S. patent publications which disclose controllable or selectable one-way clutches include U.S. Pat. Nos. 6,193,038; 7,198,587; 7,275,628; and 7,464,801, and U.S. Publication Application Nos. 2007/0278061; 2008/0110715; 2009/0159391; 2009/0211863; 2010/0230226; and 2014/0190785.

Other U.S. patent documents related to the present application include: U.S. Pat. Nos. 2,947,537; 2,959,062; 4,050,560; 4,340,133; 4,651,847; 6,607,292; 6,905,009; 7,942,781; 8,061,496; 8,286,772; 2004/0238306; 2006/0185957; 2007/0034470; 2009/0255773; 2010/0022342; 2010/0255954; 2011/0177900; 2012/0090952; 2012/0152683; and 2012/0152687.

As used herein, the term "sensor" is used to describe a circuit or assembly that includes a sensing element and other components. In particular, as used herein, the term "magnetic field sensor" is used to describe a circuit or assembly that includes a magnetic field sensing element and electronics coupled to the magnetic field sensing element.

As used herein, the term "magnetic field sensing element" is used to describe a variety of electronic elements that can sense a magnetic field. The magnetic field sensing elements can be, but are not limited to, Hall effect elements, magnetoresistance elements, or magnetotransistors. As is known, there are different types of Hall effect elements, for example, a planar Hall element, a vertical Hall element, and a circular vertical Hall (CVH) element. As is also known, there are different types of magnetoresistance elements, for example, a giant magnetoresistance (GMR) element, an anisotropic magnetoresistance element (AMR), a tunneling magnetoresistance (TMR) element, an Indium antimonide (InSb) sensor, and a magnetic tunnel junction (MTJ).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while magnetoresistance elements and vertical Hall elements (including circular vertical Hall (CVH) sensing elements) tend to have axes of sensitivity parallel to a substrate.

Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet, and a magnetic field sensor that senses a magnetic field density of a magnetic field.

Modern automotive vehicles employ an engine transmission system having gears of different sizes to transfer power produced by the vehicle's engine to the vehicle's wheels based on the speed at which the vehicle is traveling. The engine transmission system typically includes a clutch mechanism which may engage and disengage these gears. The clutch mechanism may be operated manually by the vehicle's driver, or automatically by the vehicle itself based on the speed at which the driver wishes to operate the vehicle.

In automatic transmission vehicles, a need arises for the vehicle to sense the position of the clutch for smooth, effective shifts between gears in the transmission and for overall effective transmission control. Therefore, a clutch-position sensing component for sensing the linear position of the clutch may be used by automatic transmission vehicles to facilitate gear shifting and transmission control.

Current clutch-position sensing components utilize magnetic sensors. One advantage to using magnetic sensors is that the sensor need not be in physical contact with the object being sensed, thereby avoiding mechanical wear between the sensor and the object. However, actual linear clutch measurement accuracy may be compromised when the sensor is not in physical contact with the sensed object because of a necessary gap or tolerance that exists between the sensor and the object. Moreover, current sensing systems addressing this problem use coils and certain application-specific integrated circuits which are relatively expensive.

U.S. Pat. No. 8,324,890 discloses a transmission clutch position sensor which includes two Hall sensors located at opposite ends of a flux concentrator outside the casing of the transmission to sense a magnetic field generated by a magnet attached to the clutch piston. To reduce sensitivity to magnet-to-sensor gap tolerances, a ratio of the voltage of one Hall sensor to the sum of the voltages from both Hall sensors is used to correlate to the piston and, hence, clutch position.

Currently many transmission electronic control units (TECUs) cannot source the power currently required for direct solenoid-based SOWC actuation. Also, some TECUs do not have the outputs available for such actuation. TECU redesigns are typically cost prohibitive due to TECU complexity and many OEMs sharing a TECU across several vehicle models.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling", "clutch" and "brake" may be used interchangeably.

SUMMARY OF EXAMPLE EMBODIMENTS

An object of at least one embodiment of the present invention is to provide an apparatus for controllably actuating a selectable coupling assembly when a remote electronic control unit is unable to provide the proper command and power signals.

In carrying out the above object and other objects of at least one embodiment of the present invention, an apparatus for controllably actuating a selectable coupling assembly is provided. The apparatus includes a bi-directionally movable, actuating shaft attachable to a movable element of the assembly to provide selective, small displacement element movement to linearly actuate the assembly. An excitation coil is arranged to be magnetically coupled with the shaft and to controllably move the shaft between positions which correspond to different operating modes of the assembly. A controller includes a power inlet terminal adapted to receive electrical power from a vehicle DC power source, a command input terminal adapted to receive a command signal from an electronic control unit and a power switching and supply circuit coupled to the coil to switch and supply received electrical power to the excitation coil based on the command signal. The shaft has sufficient actuating force to move the element and cause the assembly to change its operating mode when the electrical power energizes the excitation coil.

The controller may include a coupling device coupled to the command input terminal to couple and electrically isolate the command input terminal and the power switching and supply circuit.

The controller may include a microcontroller coupled to the command inlet terminal to receive the command signal and generate corresponding control signals for use by the power switching and supply circuit.

The power switching and supply circuit may include a power transistor to alternately connect and disconnect the excitation coil from the received electrical power in response to a signal from the coupling device.

The power switching and supply circuit may include a power transistor to alternately connect and disconnect the excitation coil from the received electrical power in response to a control signal from the microcontroller.

The electronic control unit may comprise a transmission electronic control unit.

The controller may further include a storage circuit coupled to the power inlet terminal and operative to store the received electrical power and supply the stored electrical power to the excitation coil in response to a command signal from the microcontroller.

The storage circuit may include a capacitor to store the received electrical power.

The apparatus may further include a magnetic field sensor to sense magnetic flux and produce a position feedback signal which is based on the position of the movable element. A variable magnetic field may be generated in response to movement of the element when the assembly changes its operating mode.

The sensor may include a magnetic sensing element.

The movable element may be a locking element which controls the operating mode of the assembly.

The microcontroller may receive the position feedback signal from the magnetic field sensor.

The apparatus may further include a voltage regulator coupled to the power inlet terminal to provide regulated voltage to the microcontroller and the magnetic field sensor.

Further in carrying out the above object and other objects of at least one embodiment of the present invention, an apparatus for controlling the operating mode of an overrunning coupling assembly is provided. The apparatus includes a bi-directionally movable, actuating shaft attachable to a movable element of the assembly to provide selective, small displacement element movement to linearly actuate the assembly. An excitation coil is arranged to be magnetically coupled with the shaft and to controllably move the shaft between positions which correspond to different operating modes of the assembly. A controller includes a power inlet terminal adapted to receive electrical power from a vehicle DC power source, a command input terminal adapted to receive a command signal from an electronic control unit and a power switching and supply circuit coupled to the coil to switch and supply received electrical power to the excitation coil based on the command signal. The shaft has sufficient actuating force to move the element and cause the assembly to change its operating mode when the electrical power energizes the excitation coil.

The controller may include a coupling device coupled to the command input terminal to couple and electrically isolate the command input terminal and the power switching and supply circuit.

The controller may include a microcontroller coupled to the command inlet terminal to receive the command signal and generate corresponding control signals for use by the power switching and supply circuit.

The power switching and supply circuit may include a power transistor to alternately connect and disconnect the excitation coil from the received electrical power in response to a signal from the coupling device.

The power switching and supply circuit may include a power transistor to alternately connect and disconnect the excitation coil from the received electrical power in response to a control signal from the microcontroller.

The electronic control unit may comprise a transmission electronic control unit.

The controller may further include a storage circuit coupled to the power inlet terminal and operative to store the received electrical power and supply the stored electrical power to the excitation coil in response to a command signal from the microcontroller.

The storage circuit may include a capacitor to store the received electrical power.

The apparatus may further include a magnetic field sensor to sense magnetic flux and produce a position feedback signal which is based on the position of the movable element. A variable magnetic field may be generated in response to movement of the element when the assembly changes its operating mode.

The sensor may include a magnetic sensing element.

The movable element may be a locking element which controls the operating mode of the assembly.

The microcontroller may receive the position feedback signal from the magnetic field sensor.

The apparatus may further include a voltage regulator coupled to the power inlet terminal to provide regulated voltage to the microcontroller and the magnetic field sensor.

While exemplary embodiments are described above, it is not intended that these embodiments describe all possible forms of the invention. Rather, the words used in the specification are words of description rather than limitation, and it is understood that various changes may be made

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
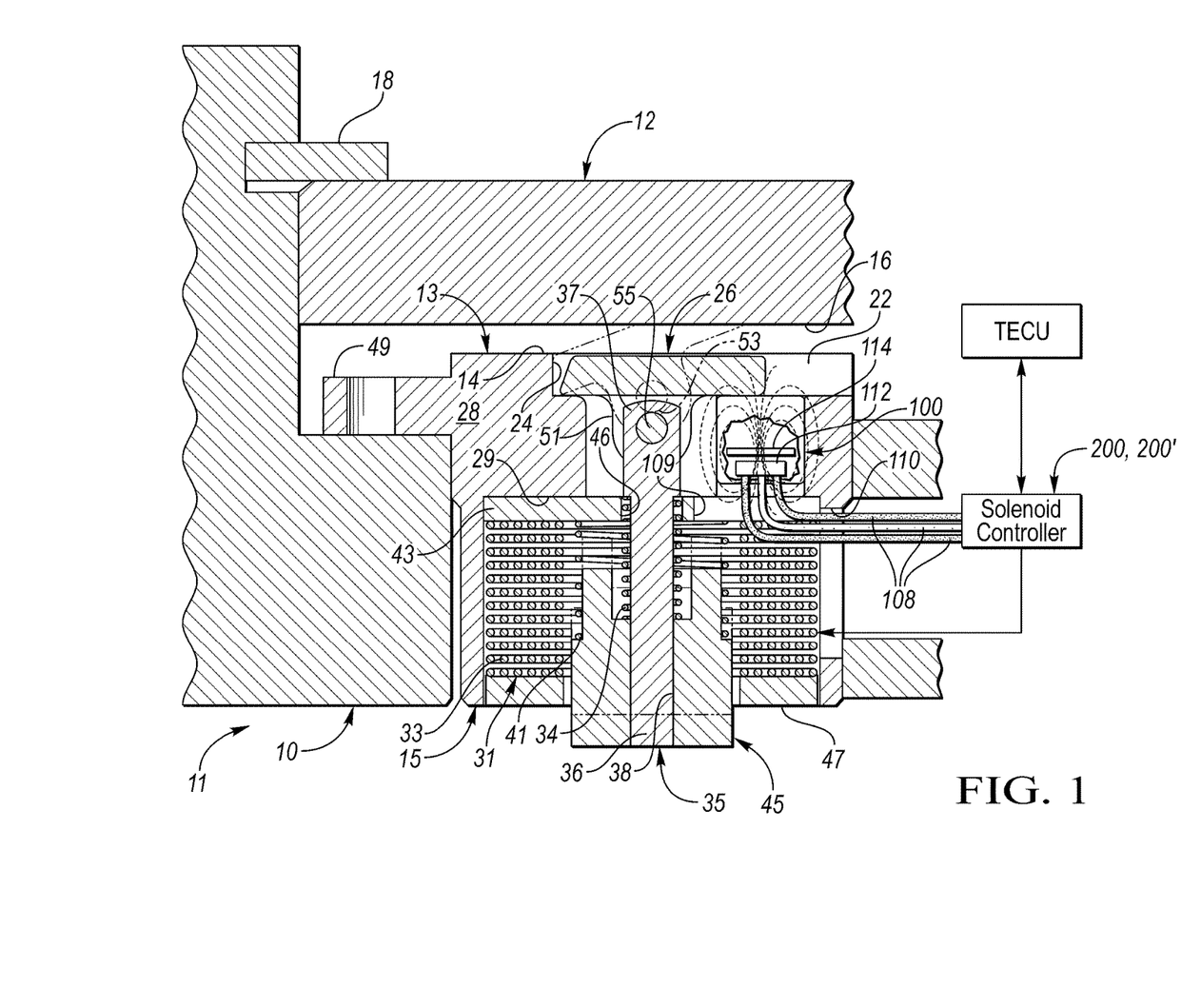
FIG. 1 is a view, partially broken away and in cross section, of an overrunning coupling and magnetic control assembly or apparatus of at least one embodiment of the present invention wherein one of the positions of a strut is shown in phantom.

Referring now to FIG. 1, there is illustrated a planar, controllable coupling assembly, generally indicated at 11. The assembly 11 is generally of the type shown in published U.S. patent application 2014/0305761. The assembly 11 includes a first coupling member, generally indicated at 10, a notch plate or member, generally indicated at 12, and an electromechanical apparatus, generally indicated at 15. The coupling assembly 11 may be a ratcheting, one-way clutch assembly. The second member 12 includes a second coupling face 16 in closed-spaced opposition with an outer coupling face 14 of a housing part 13 of the apparatus 15 when the members 10 and 12 are assembled and held together by a locking or snap ring 18. At least one of the members 10 and 12 is mounted for rotation about a common rotational axis.

The outer coupling face 14 of the housing part 13 has a single, T-shaped recess or pocket 22. The recess 22 defines a load-bearing first shoulder 24. The second coupling face 16 of the notch plate 12 has a plurality of recesses or notches (not shown but well known in the art). Each notch of the notches defines a load-bearing second shoulder.

The electromechanical apparatus 15 may include a locking strut or element, generally included at 26, disposed between the coupling faces 14 and 16 of the housing part 13 and the member 12, respectively, when the members 10 and 12 are assembled and held together.

The element 26 may comprise a ferromagnetic locking element or strut movable between first and second positions. The first position (phantom lines in FIG. 1) is characterized by abutting engagement of the locking element 26 with a load-bearing shoulder (not shown) of the member 12 and the shoulder 24 of the pocket 22 formed in an end wall 28 of the housing part 13. The second position (solid lines in FIG. 1) is characterized by non-abutting engagement of the locking element 26 with a load-bearing shoulder of at least one of the member 12 and the end wall 28.

The electromechanical apparatus 15 includes the housing part 13 which has a closed axial end including the end wall 28. The end wall 28 has the outer coupling face 14 with the single pocket 22 which defines the load-bearing shoulder 24 which is in communication with an inner face 29 of the end wall 28. The housing part 13 may be a metal (such as aluminum) injection molded (MIM) part.

The apparatus 15 also includes an electromagnetic source, generally indicated at 31, including at least one excitation coil 33 which is at least partially surrounded by a skirt of the housing part 13.

The element or strut 26 is shown as being received within the pocket 22 in its retracted, uncoupling position in FIG. 1. The strut 26 is movable outwardly from the pocket 22 to an extended coupling position (phantom lines in FIG. 1) characterized by abutting engagement of the strut 26 with a load-bearing shoulder of the notch plate 12 and the shoulder 24.

The apparatus 15 also includes a bi-directionally movable, actuating shaft or reciprocating armature, generally indicated at 35, arranged concentrically relative to the at least one excitation coil 33 and is axially movable when the at least one excitation coil 33 is supplied with current. The coil 33 is wound about a tube 45 between plates 43 and 47. The plate 43 abuts against the surface 29. The armature 35 extends through a hole 46 formed through the plate 43 and is connected at its leading end 37 to the element 26 to move the element 26 between its coupling and uncoupling positions. The armature 35 also extends through an aperture 38 formed through the tube 45. The opposite end 36 of the armature 35 has a locking ring (not shown) which limits movement of the armature 35 in the aperture 38 towards the plate 12 by abutting against the lower surface of the tube 45 but allows the armature 35 to extend below the lower surface of the tube 45.

The element 26 is pivotally connected to the leading end 37 of the armature 35 wherein the armature 35 pivotally moves the element 26 within the pocket 22 in response to reciprocating movement of the armature 35.

The apparatus 15 also preferably includes a return spring 41, which extends between the plate 43 and a shoulder in the outer surface of the tube 45, to return the armature 35 and the tube 45 to their home position when the coil 33 is de-energized, thereby returning the element 26 to its uncoupling position. The apparatus also includes a spring 34 which urges the armature 35 to move the element 26 towards its coupling position. In other words, the biasing member, the spring 41, urges the armature 35 via the tube 45 to a return position which corresponds to its uncoupling position of the element 26 while the biasing member or spring 34 urges the armature 35 and connected element 26 to its coupled position and opposes any force in the opposite direction.

The housing part 13 and/or the plate 47 preferably has holes to allow oil to circulate within the housing part 13. Preferably, the at least one coil 33, the housing part 13, the tube 45 and the armature 35 comprise a low profile solenoid.

The locking element 26 may be a metal (such as aluminum) injection molded (i.e. MIM) strut.

The housing part 13 has at least one apertured attachment flange 49 to attach the apparatus 15 to the coupling member 10 (corresponding aperture not shown) of the coupling assembly 11.

The element 26 includes at least one and, preferably, two projecting leg portions 51 which provide an attachment location for the leading end 37 of the armature 35. Each leg portion 51 has an aperture 53. The apparatus 15 further comprises a pivot pin 55 received within each aperture 53 to allow rotational movement of the element 26 in response to reciprocating movement of the armature 35 wherein the leading end 37 of the armature 35 is connected to the element 26 via the pivot pin 55.

Preferably, each aperture 53 is an oblong aperture which receives the pivot pin 55 to allow both rotation and translational movement of the element 26 in response to reciprocating movement of the armature 35. Each locking strut 26 may comprise any suitable rigid material such as ferrous metal, (i.e. steel).

One or more proximity sensors such as a magnetic field sensor or device, generally indicated at 100, may be a Hall-effect sensor which senses position of the strut 26. The strut 26 may carry or support a rare-earth, automotive grade, magnet or pellet (not shown) which may be embedded in a hole formed in the outer surface of the strut 26. In that case, the strut 26 is a non-ferrous strut such as an aluminum strut. Alternatively, and preferably, the strut 26 is a ferromagnetic strut.

The device 100 typically has three wires 108 (input, output and ground) and provides an industry standard, push-pull voltage output based on position of the strut 26 in the pocket 22. The device 100 accurately detects the position of the strut 26 with a single output (i.e., voltage output). The device 100 is preferably mounted adjacent to and below the pocket 22 and the wires 108 extend through an aperture 109 formed in the plate 43 and through an aperture 110 formed through the side wall or skirt of the housing part 13. The wires 108 are coupled to a controller (i.e. solenoid controller 200 or 200' in FIGS. 1-3) which, in turn, is coupled to a remote transmission electric control unit or TECU and a vehicle battery power supply to supply electrical power to the coil 33 in response to control signals from the TECU. The device 100 may be held in place by fasteners or by an adhesive so that an upper surface of the device 100 is in close proximity to the bottom surface of the strut 26 in the uncoupling position of the strut 26.

The sensor 100 is typically back-biased when the strut 26 is ferromagnetic and typically includes a Hall sensor or sensing element mounted on a circuit board 114 on which other electronics or components are mounted, as is well-known in the art. The sensor 100 is preferably back-biased in that it includes a rare-earth magnet 112 which creates a magnetic flux or field which varies as the strut 26 moves.

In other words, the device 100 is preferably a back-biased device wherein the device includes a rare earth pellet or magnet whose magnetic field varies as the strut 26 moves towards and away from its uncoupled position. The variable magnetic field is sensed by the magnetic sensing element of the device 100.

The output signal from the device 100 is a feedback signal which is received by the solenoid controller 200' which, in turn, provides electrical power in the form of electrical current to the coil 33 of the electromagnetic source 31. By providing feedback, the resulting closed-loop control system has improved sensitivity, accuracy and repeatability.

The electromechanical apparatus 15 of the exemplary clutch assembly 11 may be carried by a driving member of the clutch assembly 11 or a driven member of the assembly 11. Moreover, the strut 26 of the exemplary clutches assemblies may have any suitable configuration depending on whether the assembly is a planar coupling assembly as shown herein or a rocker coupling assembly (not shown). Also, each strut or rocker (in a radial coupling assembly) may have a middle portion that is thicker than each end portion of the strut or rocker.

Figure 2:
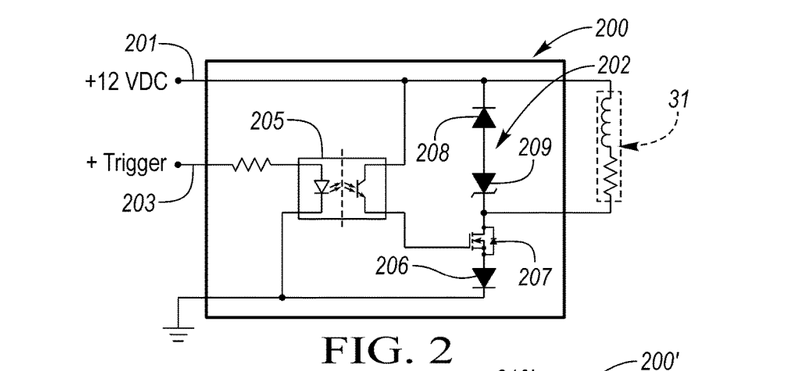
FIG. 2 is a circuit diagram an embodiment of a controller for receiving electrical power from a vehicle DC power source and a command signal from a remote electronic control unit to, in turn, switch and supply the received electrical power to an excitation coil based on the received command signal.

Referring now to FIG. 2, there is illustrated the controller 200 including a power switching and supply circuit 202 to supply DC electrical power to the coil 33 in response to command signal from the TECU during normal operation.

The controller 200 includes a power inlet terminal 201 adapted to receive electrical power from a vehicle 12 volt DC power source, a command input terminal 203 adapted to receive a command signal (trigger) from the remote transmission electronic control unit (TECU) and the power switching and supply circuit 202 coupled to the coil 33 to switch and supply received electrical power to the excitation coil 33 based on the command signal. The shaft 35 has sufficient actuating force to move the element 26 and cause the assembly to change its operating mode when the electrical power energizes the excitation coil 33 of the electromagnetic source 31.

The controller 200 includes a coupling device in the form of an optoisolator 205 coupled to the command input terminal 203 to couple and electrically isolate the command input terminal 203 and the power switching and supply circuit 202.

The power switching and supply circuit 202 includes a power transistor 207 to alternately connect and disconnect the excitation coil 33 of the electromagnetic source 31 from the received electrical power in response to a signal from the coupling device 205.

The circuit 202 further includes a snubber circuit or clamping network in the form of a fly wheel diode 208 and a zener diode 209 to dissipate back EMF when the transistor 207 turns the coil 33 "off" and to allow faster switching and control peak reverse voltage and drop-out time, respectively.

The power transistor 207 provides low side switching and is preferably an N channel MOSFET including a diode between the drain and source of the transistor 207 to suppress over voltage switching transients and noise. The MOSFET 207 is used as an electronic switch with control provided at its gate by the optoisolater 205. Alternatively, an insulated gate, bipolar transistor (IGBT) may be used instead of the MOSFET 207.

Reverse polarity protection is provided by a diode 206.

The embodiment in FIG. 2 is specifically for integrating the vehicle's transmission electronic control unit (TECU) and control of the coupling assembly through the coil 33 of the source 31 and the shaft 35 (i.e. the solenoid).

The TECU regulates the power to drive the solenoid. The controller 200 connects the solenoid to the TECU so that control of the solenoid is achieved. The TECU decides whether to drive the solenoid and sets a digital output accordingly to drive the solenoid. Existing TECU's have traditionally employed variable force solenoid valve control to manipulate the transmission's hydraulic control circuit to change clutch states. Solenoid-based, SOWC actuation as provided herein repurposes the TECU's existing output in order to minimize cost and preserve a common TECU for both hydraulic and solenoid-based SOWC actuation schemes. In order to provide a minimally invasive method for the existing TECU architecture to control the solenoid, the controller 200 is provided. The controller could be implemented or realized with discrete logic (i.e. FIG. 2) or a microcontroller (i.e. FIG. 3) depending on the system's requirements.

In summary, the circuitry of FIG. 2 allows the TECU to control the solenoid requiring only a single TECU digital output for determining solenoid actuation. There are a number of ways that the switching of the controller can be achieved such as a discrete solid state switch.

Figure 3:
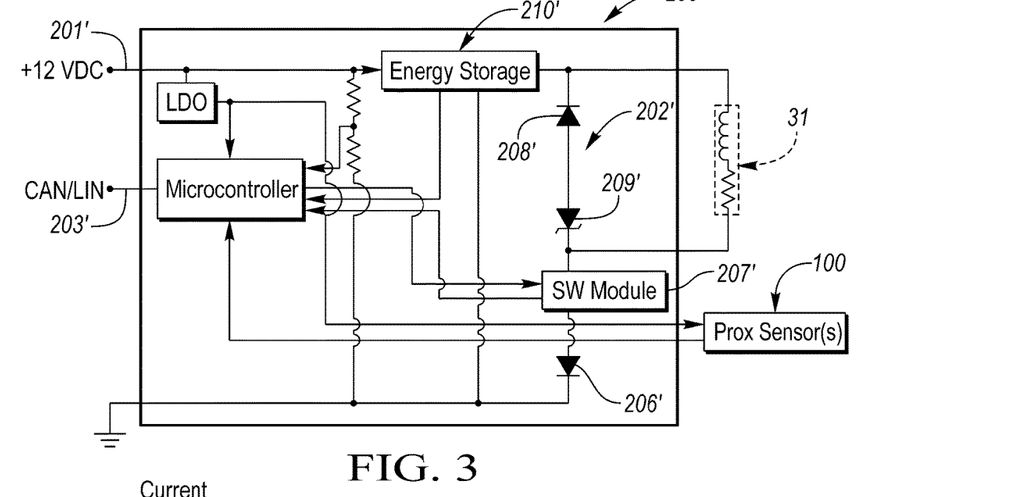
FIG. 3 is a block diagram schematic view of another embodiment of the controller including an energy storage circuit together with one or more proximity sensors.

Referring now to FIG. 3, a second, more sophisticated embodiment of a controller is generally indicated at 200' and includes many of the components of the controller of FIG. 2 and, consequently, have the same reference number but a single prime designation in FIG. 3. The more sophisticated implementation of FIG. 3 can be programmed to perform a profiled apply in order to reduce the noise, vibration and harshness (NVH) signature of turning on the solenoid. An energy storage circuit in FIG. 3 can provide a voltage boost to turn on solenoids that would otherwise result in an unacceptable, instantaneous power draw on the vehicle's 12 VDC power system. The energy storage circuit also provides the ability to actuate the solenoid in the event of a failure on the vehicle's 12 VDC power system.

Either embodiment (i.e. FIG. 2 or FIG. 3) of the controller can act as an intermediary between the transmission control electronic unit (TECU) and the solenoid. Thus these designs could be used in conjunction with existing TECUs to operate solenoids that require more actuation power than can be supplied by current generation TECUs. For next generation TECUs this control circuitry could be integrated directly into the TECU.

Either implementation (i.e. FIG. 2 or FIG. 3) can be expanded to operate multiple solenoids to either: a) actuate multiple clutches; b) operate a latching solenoid that prevents inadvertent operation of the clutch or c) operate a clutch with 3 or more operational states via a bi-directional solenoid or multiple solenoids. Both implementations (FIGS. 2 and 3) can employ a lower holding voltage in order to reduce power consumption and heat generation in the coil.

The controller 200' also includes a microcontroller including control logic which may alternatively be found within other circuitry. The controller 200' typically receives command signals at input terminal 203 from the remote electronic control unit (TECU) over or through a vehicle-based bus (i.e. CAN/LIN). FIG. 3 also shows an energy surge circuit 210' to controllably store electrical power and apply the stored electrical power to the solenoid and a low side switch (i.e. SW module 207') based on a position command signal as determined by the microcontroller. The microcontroller generates the control signals to the module 207' while the TECU remains in a supervisory role. The microcontroller could be replaced with an FPGA or an extensive array of discrete modules. The controller 200' can be designed with or without low level diagnostics reporting to the TECU and then could receive actuation commands via digital outputs from the TECU and send high level status (i.e. sensor status or controller status) information back to the TECU via digital outputs on the microcontroller.

The microcontroller (i.e. MCU) typically receives command signals from the TECU through a vehicle CAN bus. The MCU also receives various monitor, control and feedback signals to monitor different voltages within the controller 200' to properly control the switch module 207'. The MCU receives one or more feedback signals from the Hall effect sensor(s) 100 and a current feedback signal based on solenoid current. In turn, the MCU controls the operation of the energy storage circuit 210' as well as the switching module 207'. The switching module 207' may incorporate the snubber circuit.

An LDO (i.e. low dropout), DC linear voltage regulator provides regulated voltage to the MCU and the Hall effect sensor(s) 100.

Figure 4:
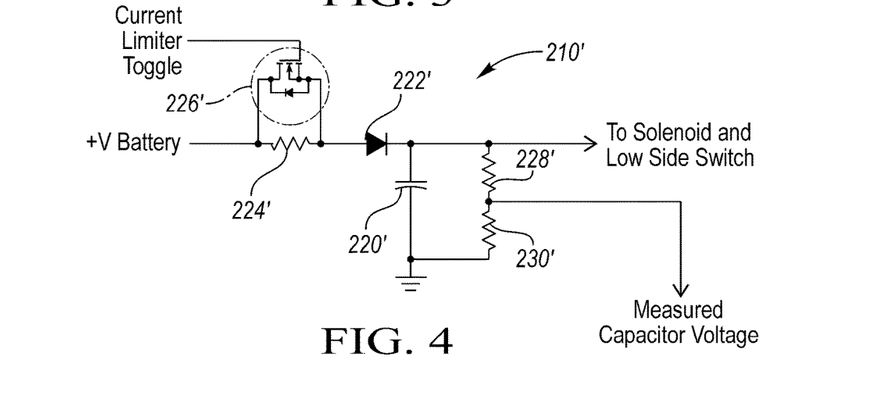
FIG. 4 is a circuit diagram of the energy storage circuit of FIG. 3.

Referring to FIG. 4, the energy storage circuit 210' includes at least one capacitor 220', a diode 222', a current limiting resister 224' and a FET 226' for switching in and out. The diode 222' can be substituted for a power transistor in order to reduce electrical losses. A capacitor voltage monitoring circuit (resisters 228' and 230') provides a signal to the MCU representing measured voltage across the capacitor 220'. The signal may not be required if temperature/input voltage is known.

The resister 224' limits in-rush current to the capacitor 220' and the solenoid during actuation. If a power transistor is used in place of the diode 222', the microcontroller can turn off the transistor to prevent back discharging. The diode 222' prevents the capacitor 220' from discharging back onto the vehicle 12 volt DC bus.

The remote transmission ECU (TECU) typically has a microprocessor, called a central processing unit (CPU), in communication with a memory management unit (MMU). The MMU controls the movement of data among the various computer readable storage media and communicates data to and from the CPU. The computer readable storage media preferably include volatile and nonvolatile storage in read-only memory (ROM), random-access memory (RAM), and keep-alive memory (KAM). For example, KAM may be used to store various operating variables while CPU is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU in controlling the transmission or vehicle into which the transmission is mounted.

The computer-readable storage media may also include floppy disks, CD-ROMs, hard disks, and the like. The CPU communicates with various sensors, switches and/or actuators directly or indirectly via an input/output (I/O) and actuators directly or indirectly via an input/output (I/O) interface or vehicle bus (i.e., CAN, LIN, etc.). The interface may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to CPU. Some controller architectures do not contain an MMU. If no MMU is employed, the CPU manages data and connects directly to ROM, RAM, and KAM coupled to the MMU or CPU depending upon the particular application.

The various components or functions of the controllers 200 and 200' of FIGS. 2 and 3, respectively, are preferably implemented by the separate or stand alone controllers as illustrated, depending upon the particular application and implementation. The MCU of the controller 200' typically includes the control logic to control the SW module 202'. The control logic may be implemented in hardware, software, or a combination of hardware and software.

The controller 200' of FIG. 3 typically includes the energy storage device or power circuit 210' of FIG. 4 to controllably store and supply the stored electrical power to the solenoid.

The circuit of FIG. 4 comprises power circuitry for powering the solenoid and the MCU and the sensors 100 (through the LDO) from the vehicle's 12 VDC power supply. In normal operation, with the vehicle's 12 VDC present, the solenoid's and the microcontroller's power will be sourced through the input terminal 201' that receives the vehicle's 12 VDC power. After the vehicle's 12 VDC power has stabilized and the capacitor 220' potential has reached a predetermined level, the microcontroller (i.e. MCU) turns on the transistor 226' (at its gate) and runs the circuit 210' until the storage capacitor 220' is fully charged as determined by the MCU via the resistors 228' and 230'. The primary purpose of the resistor 224' is to limit initial current draw from the vehicle's 12 VDC bus when charging the capacitor. The transistor 226' removes the current limiting resistor 224' from the circuit when required by the switching circuit 207'. The resistors 228' and 230' provide voltage feedback of the capacitor's potential level, allowing the MCU to decide when the capacitor has reached a high enough potential level that the current draw without the limiting resistor 224' is acceptable.

As will be appreciated by one of ordinary skill in the art, one or more memory devices within the transmission ECU and/or the controller 200' may store a plurality of activation schemes for the locking member or element 26 and may represent any one or more of a number of known processing strategies such as event-driven, interrupt-driven, multi-tasking, multi-threading, and the like. As such, various steps or functions may be performed in sequence, in a modified sequence, in parallel, or in some cases omitted. Likewise, the order of operation or processing is not necessarily required to achieve the objects, features, and advantages of the invention, but is provided for ease of illustration and description.

Although not explicitly illustrated, one of ordinary skill in the art will recognize that one or more of the illustrated steps or functions may be repeatedly performed depending upon the particular application and processing strategy being used. Preferably, the control logic is implemented primarily in software executed by a microprocessor-based controller or the microcontroller (i.e. MCU). Of course, the control logic may be implemented in software, hardware, or a combination of software and hardware depending upon the particular application. When implemented in software, the control logic is preferably provided in a computer-readable storage medium having stored data representing instructions executed by a computer to control the control the locking member 26 of the assembly through the solenoid. The computer-readable storage medium or media may be any of a number of known physical devices which utilize electric, magnetic, and/or optical devices to temporarily or persistently store executable instructions and associated calibration information, operating variables, and the like.

Figure 5:
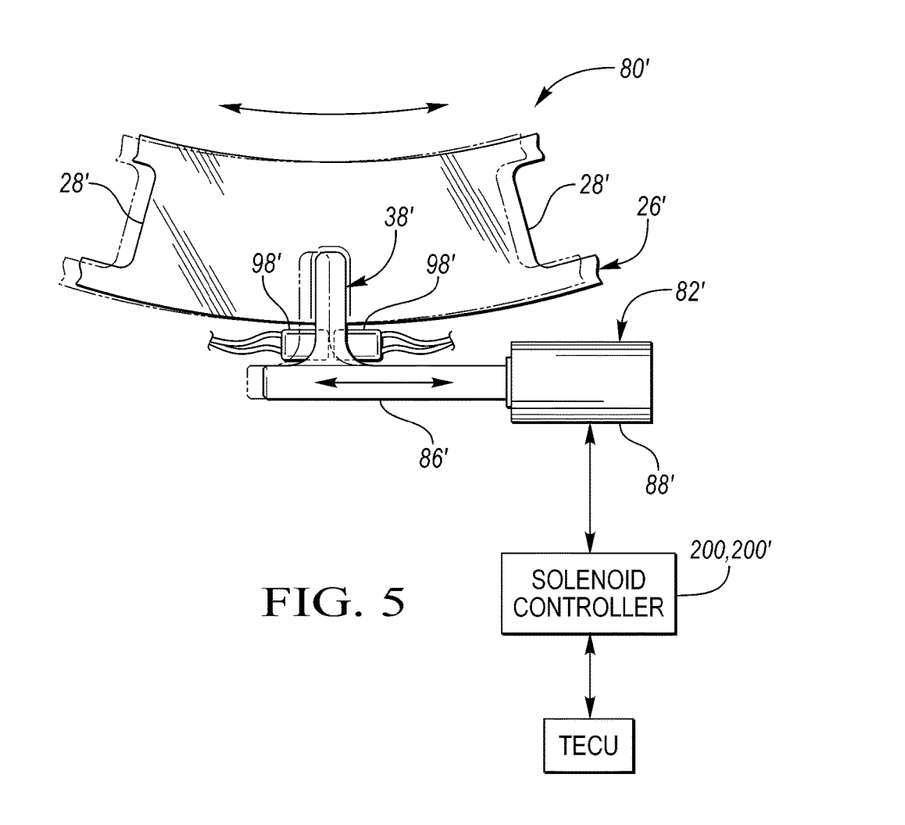
FIG. 5 is a view, partially broken away, of a second embodiment of an apparatus for controllably actuating a selectable coupling assembly wherein one of the positions of a selector plate is shown in phantom.

In another example embodiment of FIG. 5, an apparatus or system 80' controllably moves a control element or plate 26'. The selector plate 26' has a plurality of spaced apertures 28' to allow struts to pivot in their pockets. The plate 26' is electromechanically driven by the apparatus 80' which includes a linear actuator 82' such as a solenoid 88' having a shaft or armature 86' and via an actuator pin 38'. The MCU outputs drive commands to the switching module 207' based on outputs from Hall effect sensor(s) 98', current feedback from the module 207' and decoded commands from the transmission ECU. The MCU controls the solenoid 88' through the module 207' of the controller 200' so that the position of the control element or plate 26' is changed. In other words, the transmission ECU outputs drive commands to the controller 200 or 200' which controls the solenoid 88' and, through the pin 38', the selector plate or element 26'.

The TECU and the controller 200' are connected via a vehicle bus such as a local interconnect network (LIN) or CAN) line or bus capable of two-way communications. LIN is one of many possible in-vehicle local area network (LAN) communications protocols. A battery voltage power line and a ground line may be provided to the controller 200 or 200'. The controller 200' typically includes a transceiver interface within the MCU, a microprocessor and its control logic within the MCU, the SW module 207', and an electrical power source (provided by the energy storage circuit 210'). The controller 200 or 200' may be integrated or physically coupled with the solenoid in the clutch or coupling housing, while the TECU is provided some distance away from the clutch housing.

The power source to the controller 200' supplies electric power of predetermined voltage levels to the MCU and the Hall effect sensor(s) 100 through the LDO. The transceiver within the MCU is a communications interface circuit connected to the network or vehicle bus for communications and operates as a receiver section for the MCU and a transmitter section back to the TECU.

The Hall effect sensor(s) 100 are typically provided near the strut 26 and the sensors 98' are typically located near the actuator pin 38' or near a tab feature on the plate 26' to generate pulse signals which are received by the MCU.

The MCU of the controller 200' typically includes a memory and may be configured as a conventional microcomputer including a CPU, a ROM, a RAM and the like or as a hardwired logic circuit.

The TECU and the controller 200' may perform data communications regularly through the LIN or CAN bus. In such data communications, the controller 200' may transmit state data indicating the state of the solenoid to the TECU. The state data may include present linear position of the shaft of the solenoid.

When the logic circuit of the MCU of the controller 200' receives a drive command from the TECU through its transceiver, it transmits a drive command or signal to the SW module 207' to energize the solenoid to move the shaft to a desired target stop position.

If the detected, present position of the strut 26 or plate 26' arrives at the target stop position, that is, the present position coincides with the target stop position, the logic circuit of the MCU transmits a stop command to the module 207'.

In communicating with the TECU, the controller 200' may transmit to the TECU the present position of the solenoid detected based on the signals of the sensor(s) 100 or 98' while the shaft is in motion. The controller 200' may also transmit to the TECU stop data indicating the stop of the solenoid when the solenoid has stopped at its target stop position. The TECU typically checks if the data received from the controller 200' includes the stop data therein. If the stop data is included, the TECU determines that the solenoid has stopped at its target stop position.

If the stop data indicating the stop of the solenoid is not included, the TECU typically compares the present linear position of the shaft of the solenoid received and the present linear positions of the solenoid received in the previous communications to check whether the present linear position has changed.

In view of the above, preferably the system or apparatus may do the following:
 a. actuate a multi-position, selectable, mechanical diode, selector plate or strut and provide mechanical holding force via a spring or other transmission interface;

b. utilizes one or more proximity sensors to determine actual position of the selector plate or strut;
c. communicate with customer's transmission electronic control unit via a CAN or other vehicle bus to receive actuation commands and send back selector plate or strut position status and system diagnostic data; and
d. provide an electronic failsafe that will return the clutch or coupling assembly to a safe position or state in the event of vehicle power loss or loss of communications with the transmission electronic control unit.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for controllably actuating a selectable coupling assembly, the apparatus comprising:
a bi-directionally movable, actuating shaft attachable to a movable element of the assembly to provide selective, small displacement element movement to linearly actuate the assembly;
an excitation coil arranged to be magnetically coupled with the shaft and to controllably move the shaft between positions which correspond to different operating modes of the assembly; and
a controller including a power inlet terminal adapted to receive electrical power from a vehicle DC power source, a command input terminal adapted to receive a command signal from an electronic control unit and a power switching and supply circuit coupled to the coil to switch and supply received electrical power to the excitation coil based on the command signal, wherein the shaft has sufficient actuating force to move the element and cause the assembly to change its operating mode when the electrical power energizes the excitation coil, wherein the controller also includes a coupling device coupled to the command input terminal to couple and electrically isolate the command input terminal and the power switching and supply circuit.

2. The apparatus as claimed in claim 1, wherein the controller includes a microcontroller coupled to the command inlet terminal to receive the command signal and generate corresponding control signals for use by the power switching and supply circuit.

3. The apparatus as claimed in claim 1, wherein the power switching and supply circuit includes a power transistor to alternately connect and disconnect the excitation coil from the received electrical power in response to a signal from the coupling device.

4. The apparatus as claimed in claim 2, wherein the power switching and supply circuit includes a power transistor to alternately connect and disconnect the excitation coil from the received electrical power in response to a control signal from the microcontroller.

5. The apparatus as claimed in claim 1, wherein the electronic control unit comprises a transmission electronic control unit.

6. The apparatus as claimed in claim 2, wherein the apparatus further comprises a magnetic field sensor to sense magnetic flux and produce a position feedback signal which is based on the position of the movable element, wherein a variable magnetic field is generated in response to movement of the element when the assembly changes its operating mode.

7. The apparatus as claimed in claim 6, wherein the sensor includes a magnetic sensing element.

8. The apparatus a claimed in claim 1, wherein the element is a locking element which controls the operating mode of the assembly.

9. The apparatus as claimed in claim 6, wherein the microcontroller receives the position feedback signal from the magnetic field sensor.

10. An apparatus for controllably actuating a selectable coupling assembly, the apparatus comprising:
a bi-directionally movable, actuating shaft attachable to a movable element of the assembly to provide selective, small displacement element movement to linearly actuate the assembly;
an excitation coil arranged to be magnetically coupled with the shaft and to controllably move the shaft between positions which correspond to different operating modes of the assembly; and
a controller including a power inlet terminal adapted to receive electrical power from a vehicle DC power source, a command input terminal adapted to receive a command signal from an electronic control unit and a power switching and supply circuit coupled to the coil to switch and supply received electrical power to the excitation coil based on the command signal, wherein the shaft has sufficient actuating force to move the element and cause the assembly to change its operating mode when the electrical power energizes the excitation coil, wherein the controller also includes a microcontroller coupled to the command inlet terminal to receive the command signal and generate corresponding control signals for use by the power switching and supply circuit, and wherein the controller further includes a storage circuit coupled to the power inlet terminal and operative to store the received electrical power and supply the stored electrical power to the excitation coil in response to a command signal from the microcontroller.

11. The apparatus as claimed in claim 10, wherein the storage circuit includes a capacitor to store the received electrical power.

12. An apparatus for controllably actuating a selectable coupling assembly, the apparatus comprising:
a bi-directionally movable, actuating shaft attachable to a movable element of the assembly to provide selective, small displacement element movement to linearly actuate the assembly;
an excitation coil arranged to be magnetically coupled with the shaft and to controllably move the shaft between positions which correspond to different operating modes of the assembly; and
a controller including a power inlet terminal adapted to receive electrical power from a vehicle DC power source, a command input terminal adapted to receive a command signal from an electronic control unit and a power switching and supply circuit coupled to the coil to switch and supply received electrical power to the excitation coil based on the command signal, wherein the shaft has sufficient actuating force to move the element and cause the assembly to change its operating mode when the electrical power energizes the excitation coil, and wherein the controller also includes a microcontroller coupled to the command inlet terminal to receive the command signal and generate corresponding control signals for use by the power switching and supply circuit, and wherein the apparatus further comprises a magnetic field sensor to sense magnetic flux and produce a position feedback signal which is based on the position of the movable element, wherein a variable magnetic field is generated in response to movement of the element when the assembly changes its operating mode, and wherein the apparatus further comprises a voltage regulator coupled to the power inlet terminal to provide regulated voltage to the microcontroller and the magnetic field sensor.

13. An apparatus for controlling the operating mode of an overrunning coupling assembly, the apparatus comprising:
a bi-directionally movable, actuating shaft attachable to a movable element of the assembly to provide selective, small displacement element movement to linearly actuate the assembly;
an excitation coil arranged to be magnetically coupled with the shaft and to controllably move the shaft between positions which correspond to different operating modes of the assembly; and
a controller including a power inlet terminal adapted to receive electrical power from a vehicle DC power source, a command input terminal adapted to receive a command signal from an electronic control unit and a power switching and supply circuit coupled to the coil to switch and supply received electrical power to the excitation coil based on the command signal, wherein the shaft has sufficient actuating force to move the element and cause the assembly to change its operating mode when the electrical power energizes the excitation coil, wherein the controller also includes a coupling device coupled to the command input terminal to couple and electrically isolate the command input terminal and the power switching and supply circuit.

14. The apparatus as claimed in claim 13, wherein the controller includes a microcontroller coupled to the command inlet terminal to receive the command signal and generate corresponding control signals for use by the power switching and supply circuit.

15. The apparatus as claimed in claim 13, wherein the power switching and supply circuit includes a power transistor to alternately connect and disconnect the excitation coil from the received electrical power in response to a signal from the coupling device.

16. The apparatus as claimed in claim 14, wherein the power switching and supply circuit includes a power transistor to alternately connect and disconnect the excitation coil from the received electrical power in response to a control signal from the microcontroller.

17. The apparatus as claimed in claim 13, wherein the electronic control unit comprises a transmission electronic control unit.

18. The apparatus as claimed in claim 14, wherein the apparatus further comprises a magnetic field sensor to sense magnetic flux and produce a position feedback signal which is based on the position of the movable element, wherein a variable magnetic field is generated in response to movement of the element when the assembly changes its operating mode.

19. The apparatus as claimed in claim 18, wherein the sensor includes a magnetic sensing element.

20. The apparatus a claimed in claim 13, wherein the element is a locking element which controls the operating mode of the assembly.

21. The apparatus as claimed in claim 18, wherein the microcontroller receives the position feedback signal from the magnetic field sensor.

22. An apparatus for controlling the operating mode of an overrunning coupling assembly, the apparatus comprising:
a bi-directionally movable, actuating shaft attachable to a movable element of the assembly to provide selective, small displacement element movement to linearly actuate the assembly;
an excitation coil arranged to be magnetically coupled with the shaft and to controllably move the shaft between positions which correspond to different operating modes of the assembly; and
a controller including a power inlet terminal adapted to receive electrical power from a vehicle DC power source, a command input terminal adapted to receive a command signal from an electronic control unit and a power switching and supply circuit coupled to the coil to switch and supply received electrical power to the excitation coil based on the command signal, wherein the shaft has sufficient actuating force to move the element and cause the assembly to change its operating mode when the electrical power energizes the excitation coil, wherein the controller also includes a microcontroller coupled to the command inlet terminal to receive the command signal and generate corresponding control signals for use by the power switching and supply circuit, and wherein the controller further includes a storage circuit coupled to the power inlet terminal and operative to store the received electrical power and supply the stored electrical power to the excitation coil in response to a command signal from the microcontroller.

23. The apparatus as claimed in claim 22, wherein the storage circuit includes a capacitor to store the received electrical power.

24. An apparatus for controlling the operating mode of an overrunning coupling assembly, the apparatus comprising:
a bi-directionally movable, actuating shaft attachable to a movable element of the assembly to provide selective, small displacement element movement to linearly actuate the assembly;
an excitation coil arranged to be magnetically coupled with the shaft and to controllably move the shaft between positions which correspond to different operating modes of the assembly; and
a controller including a power inlet terminal adapted to receive electrical power from a vehicle DC power source, a command input terminal adapted to receive a command signal from an electronic control unit and a power switching and supply circuit coupled to the coil to switch and supply received electrical power to the excitation coil based on the command signal, wherein the shaft has sufficient actuating force to move the element and cause the assembly to change its operating mode when the electrical power energizes the excitation coil, wherein the controller also includes a microcontroller coupled to the command inlet terminal to receive the command signal and generate corresponding control signals for use by the power switching and supply circuit, wherein the apparatus further comprises a magnetic field sensor to sense magnetic flux and produce a position feedback signal which is based on the position of the movable element, wherein a variable magnetic field is generated in response to movement of the element when the assembly changes its operating mode, and wherein the apparatus further comprises a voltage regulator coupled to the power inlet terminal to provide regulated voltage to the microcontroller and the magnetic field sensor.

* * * * *

UNITED STATES PATENT AND TRADEMARK OFFICE
CERTIFICATE OF CORRECTION

PATENT NO.         : 9,909,631 B2
APPLICATION NO.    : 14/940226
DATED              : March 6, 2018
INVENTOR(S)        : Ryan W. Essenmacher et al.

It is certified that error appears in the above-identified patent and that said Letters Patent is hereby corrected as shown below:

In the Claims

Column 17, Line 65, Claim 20:
After "The apparatus"
Delete "a" and
Insert -- as --.

Signed and Sealed this
Twenty-sixth Day of June, 2018

Andrei Iancu
*Director of the United States Patent and Trademark Office*